(12) United States Patent
Gasbarro

(10) Patent No.: US 8,535,124 B1
(45) Date of Patent: Sep. 17, 2013

(54) POULTRY TENDER TENDON CLIPPER

(71) Applicant: Remington Holdings LLC, Columbus, OH (US)

(72) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 13/653,825

(22) Filed: Oct. 17, 2012

(51) Int. Cl.
*A22C 18/00* (2006.01)

(52) U.S. Cl.
USPC .................................................. 452/149

(58) Field of Classification Search
USPC .............. 452/125, 127–130, 54, 153–155, 452/165, 187–189, 166–169, 185, 170
See application file for complete search history.

(56) References Cited

U.S. PATENT DOCUMENTS

| | | | |
|---|---|---|---|
| 5,312,291 A * | 5/1994 | van den Nieuwelaar et al. | 452/165 |
| 5,314,374 A | 5/1994 | Koch et al. | |
| 5,411,434 A | 5/1995 | McGoon et al. | |
| 5,643,074 A * | 7/1997 | Linnenbank | 452/165 |
| 5,713,787 A | 2/1998 | Schoenmakers et al. | |
| 5,827,116 A | 10/1998 | Al et al. | |
| 5,961,383 A | 10/1999 | Janssen et al. | |
| 5,984,770 A | 11/1999 | Asano et al. | |
| 6,007,416 A | 12/1999 | Janssen et al. | |
| 6,142,863 A | 11/2000 | Janssen et al. | |
| 6,283,847 B1 * | 9/2001 | Berry et al. | 452/136 |
| 6,736,717 B1 | 5/2004 | Annema et al. | |
| 6,986,707 B2 | 1/2006 | Van Den Nieuwelaar et al. | |
| 7,059,954 B2 | 6/2006 | Annema et al. | |
| 7,232,365 B2 | 6/2007 | Annema et al. | |
| 7,232,366 B2 | 6/2007 | Van Den Nieuwelaar et al. | |
| 7,344,437 B2 | 3/2008 | Van Den Nieuwelaar et al. | |
| 7,357,707 B2 | 4/2008 | de Vos et al. | |
| 7,530,888 B2 | 5/2009 | Annema et al. | |
| 7,614,941 B2 | 11/2009 | Van den Nieuwelaar et al. | |
| 7,806,753 B2 | 10/2010 | Holms | |
| 7,824,251 B2 | 11/2010 | Van den Nieuwelaar et al. | |
| 8,192,258 B2 | 6/2012 | Janssen et al. | |
| 8,231,444 B2 * | 7/2012 | De Vos et al. | 452/136 |
| 8,292,703 B2 | 10/2012 | Van Den Nieuwelaar et al. | |
| 2007/0082595 A1 * | 4/2007 | de Vos et al. | 452/136 |
| 2009/0170417 A1 | 7/2009 | Janssen et al. | |

(Continued)

FOREIGN PATENT DOCUMENTS

EP 0813814 12/1997
EP 1454531 9/2004

*Primary Examiner* — Richard Price, Jr.
(74) *Attorney, Agent, or Firm* — Jason H. Foster; Kremblas & Foster

(57) ABSTRACT

An apparatus and method for preparing a poultry carcass for the removal of breast tenderloins therefrom. The apparatus includes a support frame positioned adjacent a conventional cone line that conveys poultry carcasses along a product path in a downstream direction. A cutting blade is mounted to the support frame and extends into the product path. The cutting blade has a piercing tip and a sharp edge that pierce and sever the connective tissue and tendon that connect a lower portion of a wishbone to a carcass that is conveyed along the blade. A separating fin extends from a top of the cutting blade for engaging the severed wishbone and folding it upwardly, away from the tenders of the carcass. A rotary tendon slicer is mounted to the support frame downstream from the cutting blade and extends into the product path for severing tendons that attach the tenders to the carcass.

13 Claims, 7 Drawing Sheets

(56) References Cited

U.S. PATENT DOCUMENTS

| | | |
|---|---|---|
| 2009/0203304 A1 | 8/2009 | Holms |
| 2010/0048114 A1 | 2/2010 | Van Den Nieuwelaar et al. |
| 2010/0120344 A1 | 5/2010 | Van Den Nieuwelaar et al. |
| 2010/0323599 A1 | 12/2010 | Hiddink et al. |
| 2011/0275298 A1* | 11/2011 | De Vos et al. ................. 452/136 |
| 2012/0225616 A1* | 9/2012 | Drabbels et al. .............. 452/136 |
| 2012/0231716 A1 | 9/2012 | Janssen et al. |

* cited by examiner

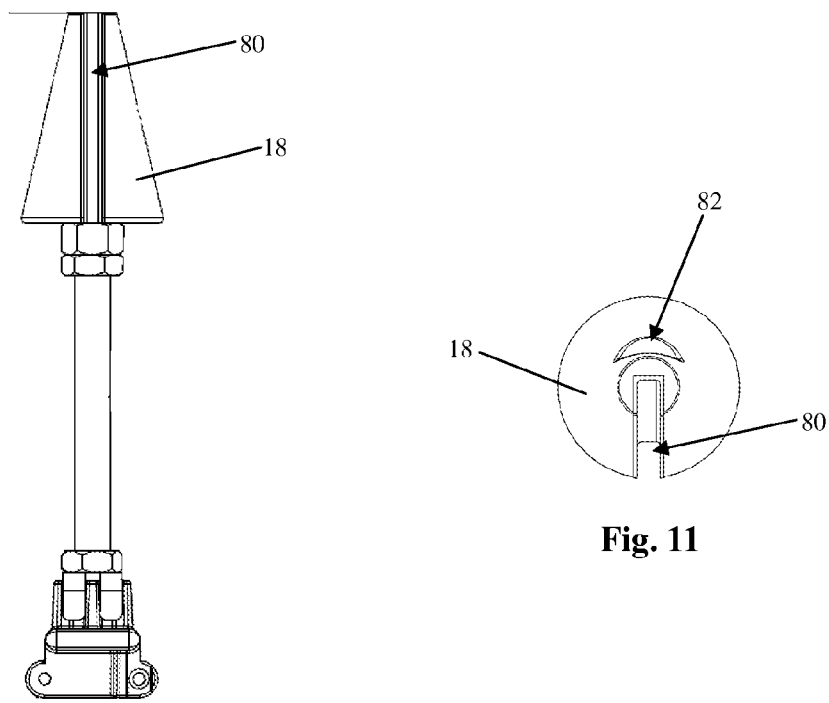
Fig. 10
Fig. 11
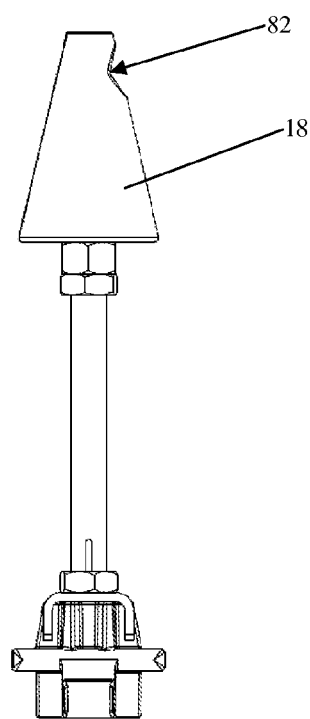
Fig. 12

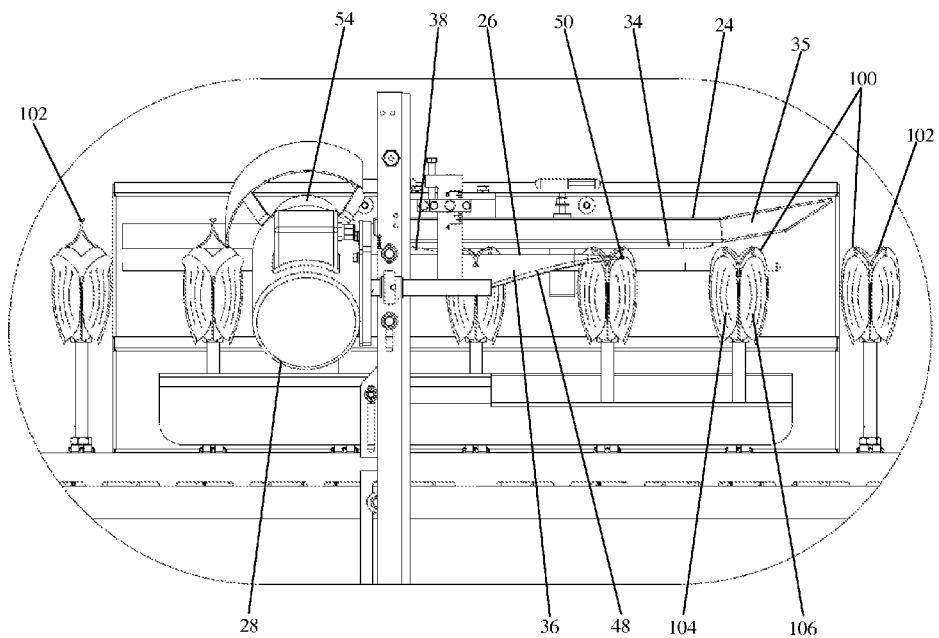
Fig. 13
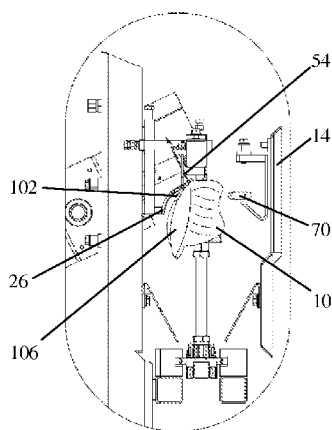 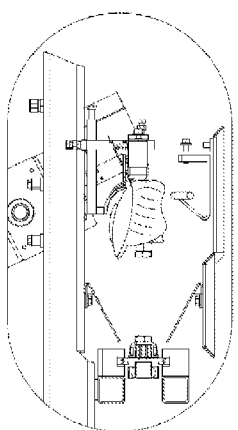 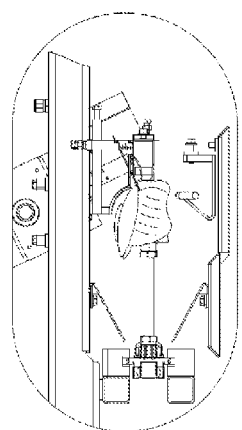
Fig. 14  Fig. 15  Fig. 16

POULTRY TENDER TENDON CLIPPER

BACKGROUND OF THE INVENTION

This invention relates generally to the field of poultry processing machines and more particularly to an apparatus and method for preparing a poultry carcass for the convenient, subsequent removal of the breast tenderloins therefrom.

Over the past several decades, the harvesting of poultry breast tenderloins, and chicken breast tenderloins in particular, has largely been performed manually. The process of manually harvesting tenderloins, commonly referred to as "tenders," from a poultry carcass typically involves several preparatory steps before the eventual stripping of the elongated tenders from the carcass. These steps commonly include separating or folding away the wishbone of the carcass from the upper portions of the tenders, followed by severing the tendons that connect the top ends of the tenders to the adjacent anatomical structures. Once prepared in this manner, the tenders can be stripped away from the carcass through the application of moderate manual force.

The above-described preparatory steps are time-consuming and require skilled labor. Even with a properly trained workforce, however, the preparation of a poultry carcass for the removal of tenders has historically been associated with the potential for accidental injury, relatively low product yields, a significant labor cost, and a certain level of inconsistency of performance naturally attendant with any manual chore of this type.

It is therefore desirable to provide means for efficiently preparing poultry carcasses, and particularly chicken carcasses, for the manual removal of breast tenders in a manner that maximizes product yields and consistency while minimizing production costs and the risk of accidental injury.

BRIEF SUMMARY OF THE INVENTION

In accordance with the present invention, there is provided an apparatus and method for preparing a poultry carcass for the convenient, subsequent removal of tenders therefrom. The apparatus generally includes a cutting station and a rear support wall that are operatively positioned on opposing sides of a conventional poultry cone line that conveys poultry carcasses along a product path in a downstream direction.

The cutting station of the apparatus includes a support frame, a mounting rail, a fixed wishbone blade, and a rotary tendon slicer. The support frame of the cutting station preferably includes a pair of longitudinally-spaced, vertically oriented support beams that are rigidly mounted to a base that is seated on a plant floor or other surface. The mounting rail of the cutting station is an elongated member that is rigidly mounted to the support frame in a longitudinally-extending orientation directly above the cones of the cone line. A longitudinally-elongated depressor bar is rigidly affixed to, and extends downwardly from, the bottom of the mounting rail.

The wishbone knife is an elongated member that includes a lower cutting blade and an upper separating fin. The wishbone knife is preferably adjustably mounted to the mounting rail by a pair of brackets in a longitudinally-extending orientation, intermediate the support frame and the cones of the cone line. The cutting blade of the wishbone knife has a curved, inwardly-facing surface that is concave relative to the cones of the cone line. The upstream edge of the cutting blade curves downwardly in the downstream direction from an upstream-most "piercing tip" formed at the juncture of the upstream and top edges of the cutting blade.

The separating fin of the wishbone knife is an elongated, substantially planar member that extends upwardly from the downstream portion of the top edge of the cutting blade. The upstream edge of the separating fin preferably curves upwardly in the downstream direction from a tapered juncture with the top edge of the cutting blade.

The rotary tendon slicer of the cutting station includes a rotatably-driven, circular blade that is adjustably mounted to the support frame, with the circular blade positioned adjacent, and orientated at a transverse angle relative to, an upper extent of the cones of the cone line.

The rear support wall of the apparatus is a longitudinally oriented wall positioned behind the cone line in a parallel orientation therewith. An elongated rear stabilizing rail is rigidly mounted to the rear support wall in a longitudinally-extending orientation directly behind the cones of the cone line. The rail preferably extends from a location upstream of the wishbone knife to a position downstream of the rotary tendon slicer.

During typical operation of the apparatus, poultry carcasses that are mounted on the cones of the cone line are conveyed in the downstream direction, along the product path, with the breasts of the carcasses facing forward. As a poultry carcass is conveyed downstream through the apparatus, it first passes under the upstream end of the mounting rail, where it is engaged by the depressor bar. The depressor bar presses downwardly on the top of the carcass and thereby flexes the wishbone of the carcass slightly outwardly.

The poultry carcass is then moved into engagement with the cutting blade of the wishbone knife, with the piercing tip of the cutting blade piercing through the carcass laterally intermediate the wishbone and the tenders of the carcass. As the poultry carcass continues downstream along the wishbone knife, the sharpened, upstream edge of the cutting blade severs the carcass from the point of entry of the piercing tip downwardly, along the curved contour of the blade, severing the tissue and tendon that connect the lower portion of the wishbone to the adjacent anatomical structures of the carcass while the wishbone itself rides on top of the cutting blade. As this cut is being made, the rear stabilizing rail prevents the poultry carcass from being displaced rearwardly.

After the lower portion of the wishbone has been completely severed from the adjacent anatomical structures, the carcass is brought into engagement with the separating fin of the wishbone knife, with the top edge of the separating fin extending into a crotch between the top ends of the wishbone and the top ends of the tenders. As the carcass moves further downstream, the separating fin lifts and rotates the wishbone upwardly, away from the tenders, to a substantially vertical orientation on the rear side of the separating fin.

Finally, the poultry carcass is conveyed into engagement with the rotating, circular blade of the rotary tendon slicer. The circular blade completely severs the tendons that attach the tops of the tenders to the adjacent anatomical structures of the carcass. The tenders can then be stripped from the carcass manually with relatively little effort.

BRIEF DESCRIPTION OF THE SEVERAL VIEWS OF THE DRAWINGS

FIG. 10 is rear detail view illustrating a poultry cone that is modified to cooperate with the preferred embodiment of the present invention shown in FIG. 1.

FIG. 11 is top detail view illustrating the cone shown in FIG. 10.

FIG. 12 is side detail view illustrating the cone shown in FIG. 10.

FIG. 13 is a front view illustrating poultry carcasses being processed by the preferred embodiment of the present invention shown in FIG. 1.

FIGS. 14-16 are a series of side views illustrating the wishbone of a poultry carcass being severed and separated from the tenders of the carcass by the preferred embodiment of the present invention shown in FIG. 1.

Figure 1:
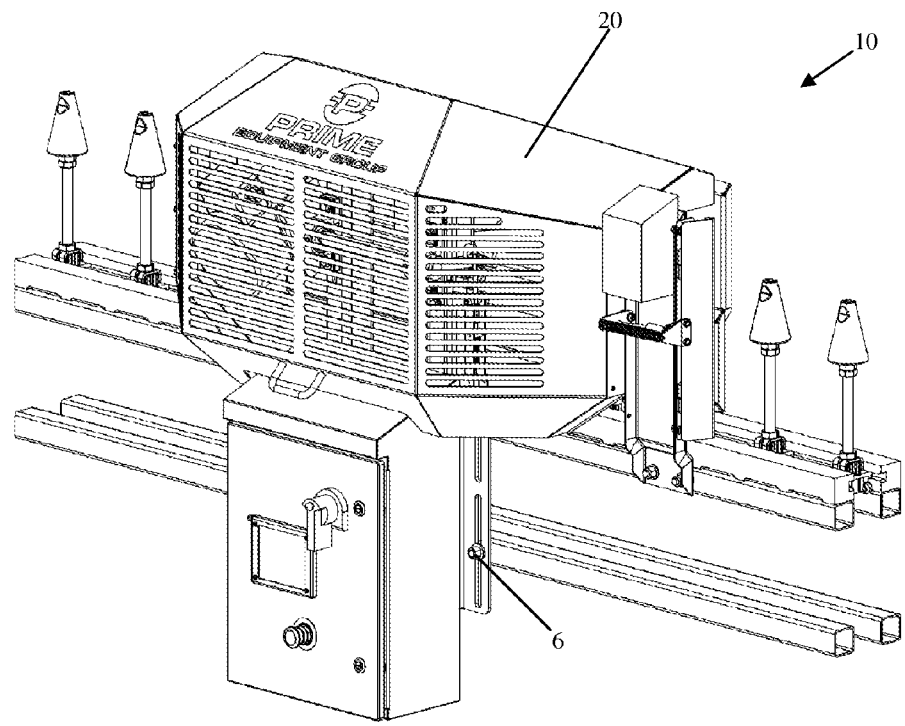
FIG. 1 is a perspective view illustrating a preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
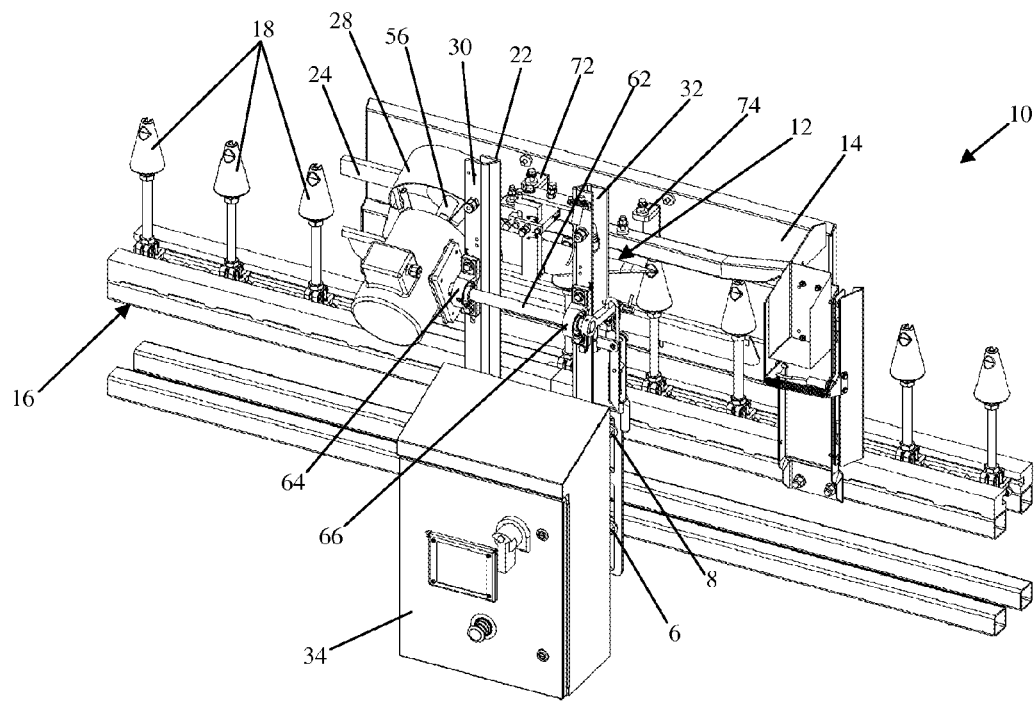
FIG. 2 is a perspective view illustrating the preferred embodiment of the present invention shown in FIG. 1 with the protective cover removed.

Referring to FIGS. 1 and 2, a poultry processing apparatus, indicated generally at 10, in accordance with the present invention is illustrated. The apparatus 10 prepares poultry carcasses for the subsequent manual removal of breast tenderloins, hereafter referred to as "tenders," therefrom. The figures illustrate the apparatus 10 being used to prepare a chicken carcass for the removal of its tenders. However, it is contemplated that the apparatus 10 can be used to process any other type of poultry in a similar manner to that described herein, with any modifications known to the person of ordinary skill being made to accommodate the different size and/or proportions of various animals.

The apparatus 10 includes a cutting station, indicated generally at 12, and a rear support wall 14. The cutting station 12 and rear support wall 14 are operatively positioned on opposing sides of a poultry cone line 16. The cone line 16 is of a conventional variety that will be familiar to those of ordinary skill in the art, but preferably includes cones 18 having several structural features (described below) that complement the components of the apparatus 10. The apparatus 10 further includes a protective cover 20 (shown in FIG. 1) removably mounted to the cutting station 12 and extending over the cone line 16 and the rear support wall 14 for shielding workers from the moving parts of the apparatus 10 and mitigating the risk of injury. The protective cover 20 also provides convenient access to the components of the cutting station 12 and rear support wall 14, such as for repair or replacement, when the cover 20 is pivoted to a raised position. The apparatus 10 is shown with the protective cover 20 entirely removed in FIGS. 2-5, 8-9, and 12-17 for clarity.

Unless otherwise noted, all components of the apparatus 10 are fabricated from stainless steel. It is contemplated that various components of the apparatus 10 can alternatively be fabricated from any other sufficiently rigid, food-grade material, including, but not limited to, aluminum, polyoxymethylene (commonly sold under the brand name DELRIN), and various composites.

For the sake of convenience and clarity, terms such as "top," "bottom," "up," "down," "front," "rear," "inward," "outward," "vertical," "horizontal," "upstream," "downstream," "lateral," and "longitudinal" will be used herein to describe the relative placement and orientation of various components of the apparatus 10, all with respect to the geometry and orientation of the apparatus 10 as it appears in FIG. 2. Particularly, the length of the apparatus 10 is along a line that extends from the rightmost end of the apparatus 10 to the leftmost end of the apparatus 10, and the term "upstream" refers to a longitudinal position nearer the right end of the apparatus 10 while the term "downstream" refers to a longitudinal position nearer the left end of the apparatus 10. Said terminology will include the words specifically mentioned, derivatives thereof, and words of similar import.

Referring to FIGS. 2-5, the cutting station 12 of the apparatus 10 includes a support frame 22, a mounting rail 24, a fixed wishbone blade 26, and a rotary tendon slicer 28. The support frame 22 of the cutting station preferably includes a pair of longitudinally-spaced, vertically oriented support beams 30 and 32 that are rigidly mounted to a base (not shown) that is seated on a plant floor or other surface. The support beams 30 and 32 are firmly supported by the base and are therefore secured against movement that could otherwise result from external forces acting on the support beams 30 and 32 or attached components. A control box 34 is preferably mounted to the front of the support frame 22 and houses control mechanisms that allow an operator to control the operation of the tendon slicer 28 and the cone line 16. The exact location of the control box 34 is not critical to the invention.

Figure 3:
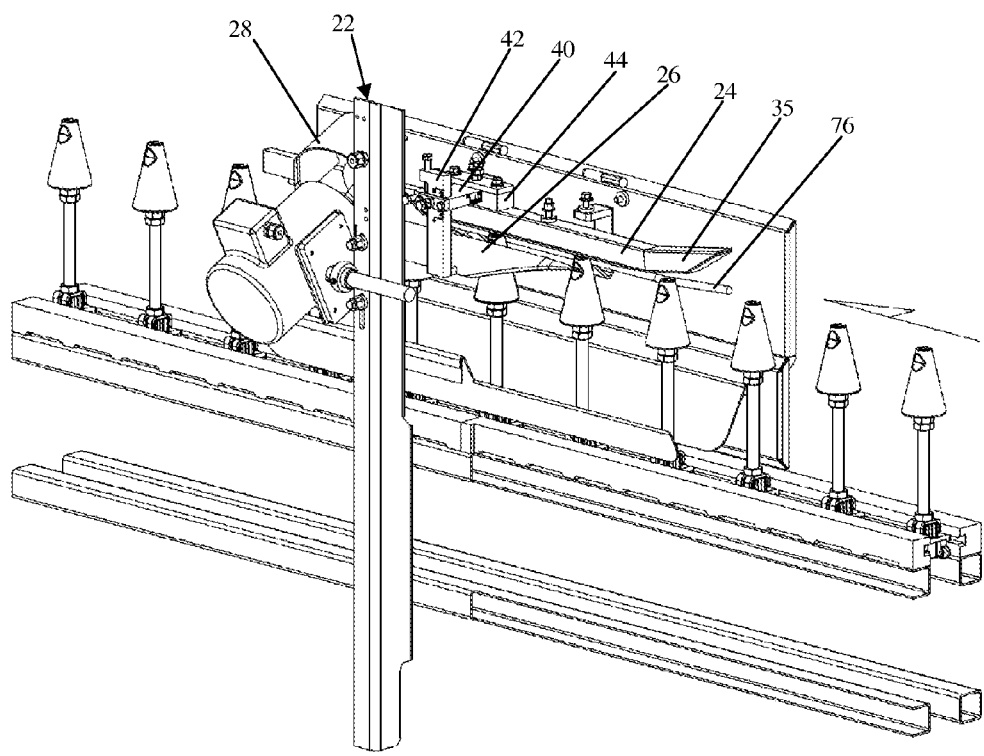
FIG. 3 is a cutaway perspective view illustrating the preferred embodiment of the present invention shown in FIG. 2.
Figure 4:
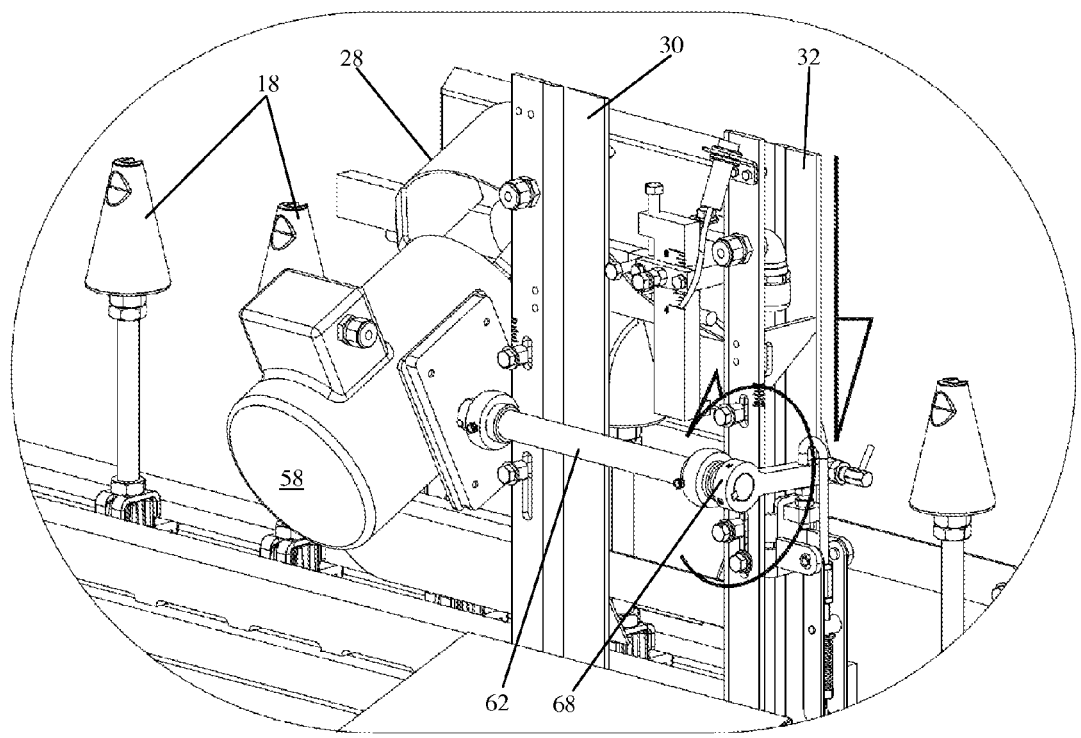
FIG. 4 is a detail perspective view illustrating the support frame of the preferred embodiment of the present invention shown in FIG. 1.
Figure 5:
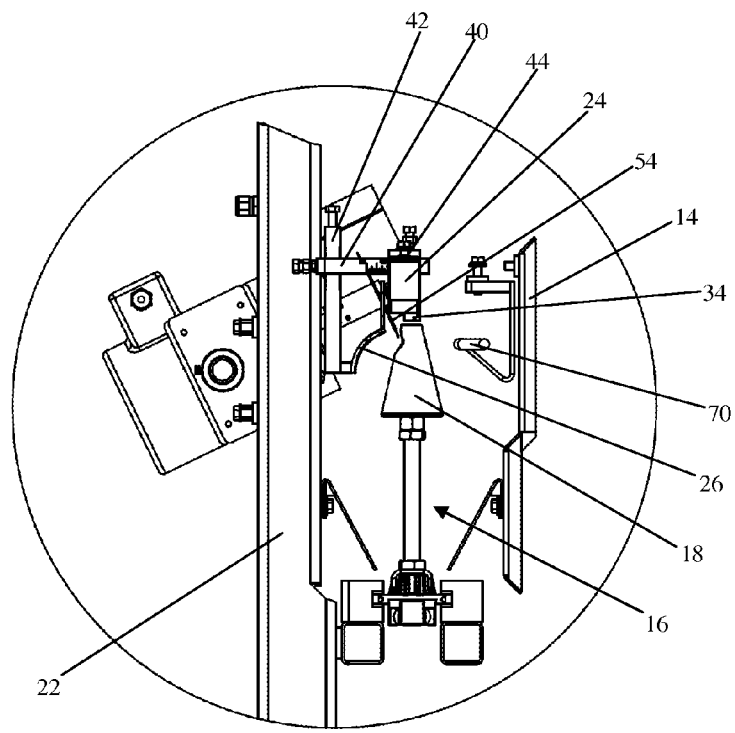
FIG. 5 is a side detail view illustrating the preferred embodiment of the present invention shown in FIG. 1.

Referring to FIGS. 2, 3, and 5, the mounting rail 24 of the cutting station 12 is an elongated, rigid member that is preferably formed of square tubing. The mounting rail 24 is rigidly mounted to the support frame 22 by a pair of brackets (not within view) in a longitudinally-extending orientation directly above the cones 18 of the cone line 16. The rail 24 extends from a location upstream of the wishbone blade 26 to a position downstream of the rotary tendon slicer 28. The rail 24 preferably has an upwardly-angled upstream end 35, but this is not critical. Referring to FIG. 5, a longitudinally-elongated depressor bar 34 is rigidly affixed to, and extends downwardly from, the bottom of the mounting rail 24. The depressor bar 34 is provided for engaging and applying downward pressure on the tops of poultry carcasses that pass thereunder, as will be described in greater detail below. It is contemplated that the depressor bar 34 can alternatively be formed as an integral, contiguous extension of the mounting rail 24 or can be entirely omitted from the apparatus 10 without departing from the invention.

Referring to FIGS. 3 and 5-9, the wishbone knife 26 is an elongated member that includes a lower cutting blade 36 and an upper separating fin 38 (described in detail below). The wishbone knife 26 is adjustably mounted to the mounting rail 24 by a pair of brackets 40 and 42 in a longitudinally-extending orientation, intermediate the support frame 22 and the cones 18 of the cone line 16. Specifically, a first, horizontally-oriented mounting bracket 40 extends laterally through, and is adjustably mounted within, a mounting cuff 44 that is rigidly affixed to the top of the mounting rail 24. The first mounting bracket 40 can be slid laterally back and forth through the mounting cuff 44 and secured in a desired position relative thereto, such as by tightening a locking nut that extends downwardly through the cuff 44 and engages the first mounting bracket 40. A second, vertically-oriented mounting bracket 42 extends downwardly through an aperture in the first mounting bracket 40 in a perpendicular relationship therewith. A lower end of the second mounting bracket 42 is rigidly affixed to the wishbone knife 26. The second mounting bracket 42 can be slid vertically through the aperture in the first mounting bracket 40 and secured in a desired position relative thereto, such as by tightening a locking nut that extends laterally through the first mounting bracket 40 and engages the second mounting bracket 42. Thus, by adjusting the positions of the first and second mounting brackets 40 and 42 in the manner described above, the lateral and vertical positions of the wishbone knife 26 can be adjusted relative to the cone line 16.

Figure 6:
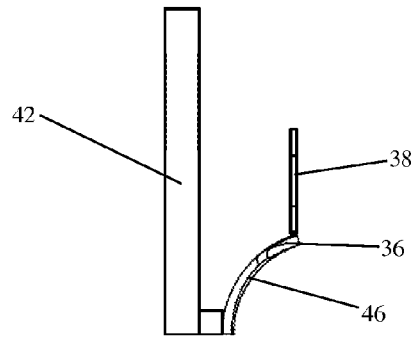
FIG. 6 is an end-on detail view illustrating the wishbone knife of the preferred embodiment of the present invention shown in FIG. 1.

Referring to the end-on view of the wishbone knife 26 shown in FIGS. 5 and 6, the cutting blade 36 of the wishbone knife 26 is curved substantially in the shape of a quarter-pipe and has a surface 46 that faces, and is concave relative to, the cones 18 of the cone line 16. Referring to the rear view of the wishbone knife 26 shown in FIG. 7, the upstream edge 48 of the cutting blade 36 curves downwardly in the downstream direction (i.e. from left to right in FIG. 7) from an upstream-most piercing tip 50 formed at the juncture of the upstream edge 48 and top edge 52 of the cutting blade 36. The piercing tip 50 and the upstream edge 48 of the cutting blade 36 are preferably sharp enough to pierce and slice the flesh and connective tissue of a typical poultry carcass conveyed thereagainst by the cone line 16 (as described below), but are preferably not sharp enough to cut or damage the wishbone or other bones of a poultry carcass.

Figure 7:
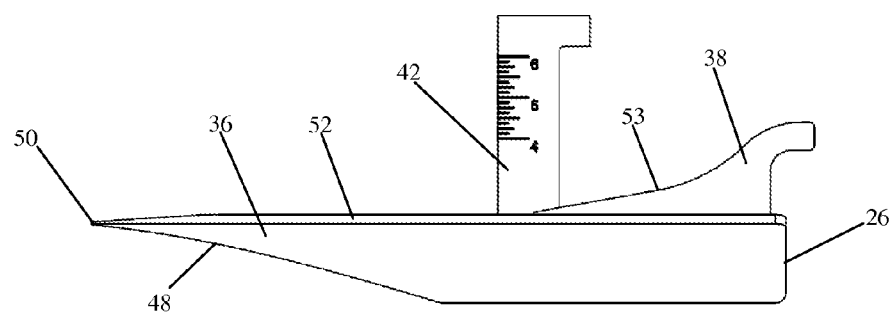
FIG. 7 is a rear detail view illustrating the wishbone knife of the preferred embodiment of the present invention shown in FIG. 1.

Referring to FIGS. 6 and 7, the separating fin 38 of the wishbone knife 26 is an elongated, substantially planar member that extends upwardly from the downstream portion of the top edge 52 of the cutting blade 36. The top edge 53 of the separating fin 38 curves upwardly in the downstream direction from a tapered juncture with the top edge 52 of the cutting blade 36.

The description and depiction of the basic shape of the wishbone knife 26 contained herein, while provided by way of example only, has been found to be particularly effective for the purposes of the present invention. It is contemplated, however, that numerous variations to the shape, position and orientation of the wishbone knife 26 can be incorporated while preserving the basic function of the wishbone knife 26 (described below) and without departing from the spirit of the invention as will be understood by those of ordinary skill in the art. For example, it is contemplated that instead of being curved, the upstream edge 52 of the cutting blade can be straight and can extend downstream from the piercing tip 50 at an acute angle. Similarly, it is contemplated that instead of being curved, the top edge 53 of the separating fin 38 can be straight and can extend from the top edge 52 of the cutting blade 36 at an acute angle.

Figure 8:
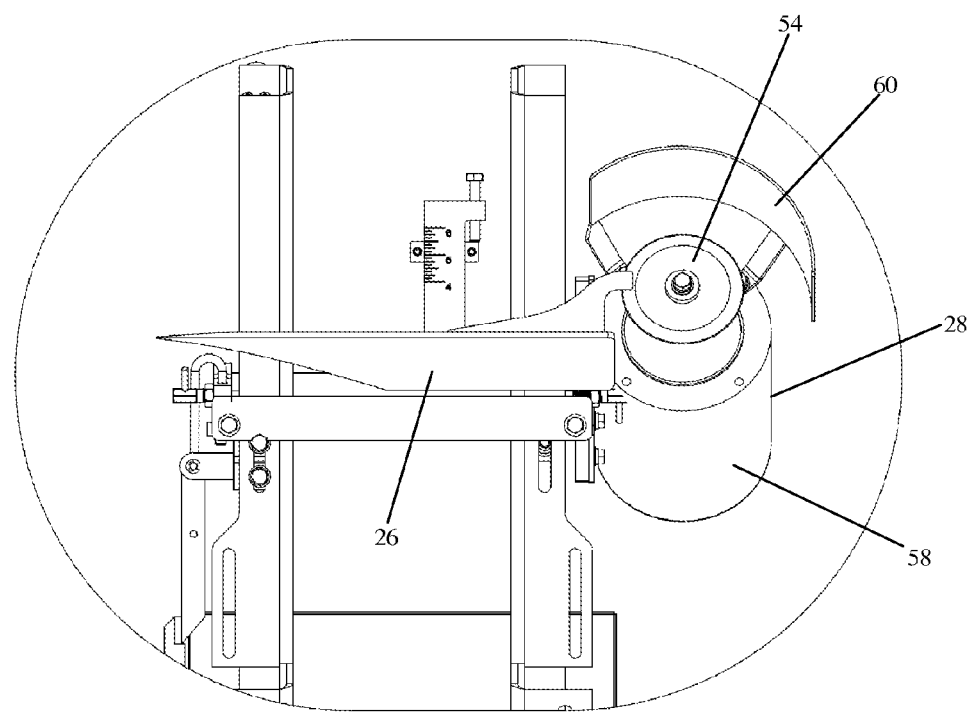
FIG. 8 is a rear detail view illustrating the wishbone knife, rotary tendon slicer, and support frame of the preferred embodiment of the present invention shown in FIG. 1.
Figure 9:
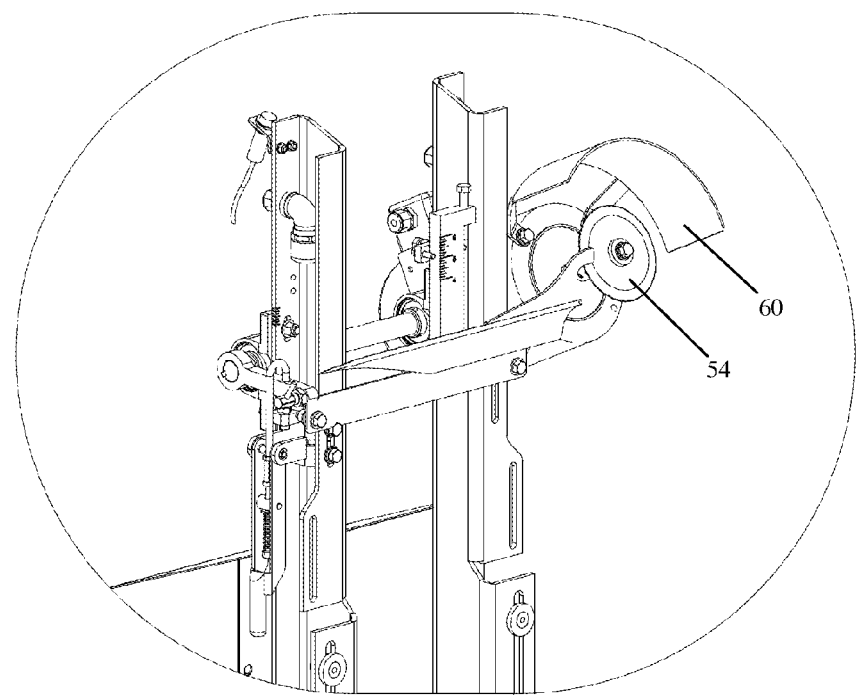
FIG. 9 is a perspective view illustrating the wishbone knife, rotary tendon slicer, and support frame of the preferred embodiment of the present invention shown in FIG. 1.

Referring to FIGS. 2, 8, and 9, the rotary tendon slicer 28 of the cutting station 12 includes a circular blade 54 that is operatively connected to a drive shaft 56 of a motor 58. The motor 58 rotatably drives the blade 54 about its axis during operation of the apparatus 10. The circular edge of the blade 54 is sharpened and is preferably partially surrounded by a curved blade guard 60 that is rigidly mounted to the motor housing and has an interior surface that is radially spaced from the edge of the blade 54 a distance of several inches. The blade guard 60 is intended to protect workers from the sharp edge of the blade 54 when the protective cover 20 (described above) is not in place. The motor 58 is preferably a conventional electric servo motor, but could be substituted by a hydraulic or pneumatic motor or any other suitable prime mover as will be understood by those of ordinary skill in the art. It is further contemplated that the rotary tendon slicer 28 can be substituted by an alternative cutting means, including, but not limited to, a reciprocating blade or a fixed, non-moving blade.

Referring to FIGS. 2, 3, 4 and 5, the rotary tendon slicer 28 is adjustably mounted to the support frame 22 downstream from the wishbone knife 26 with the circular blade 54 positioned adjacent, and orientated at a transverse angle relative to, an upper extent of the cones 18 of the cone line 16. A cylindrical mounting shaft 62 extends longitudinally from the motor housing of the rotary tendon slicer 28 and is rotatably mounted within brackets 64 and 66 (shown FIG. 2 but removed from FIGS. 4 and 5 to provide visibility of underlying structures) on the support frame 22, such as by mounting in conventional, replaceable bearings, for allowing the mounting shaft 62 to be freely rotated about its axis. The slicer 28 can thereby be manually tilted about the longitudinal axis of the mounting shaft 62 toward and away from the cone line 16 as indicated by the curved arrow in FIG. 4. The vertical position of the slicer 28 can also be adjusted by adjusting the positions of securing bolts (such as the bolts 6 and 8 shown in FIGS. 1 and 2) in their respective slots. A locking mechanism 68 is preferably attached to an end of the mounting shaft 62 opposite the rotary tendon slicer 28 for allowing the shaft 62 and the slicer 28 to be firmly secured in a desired orientation and angle relative to horizontal. As will be appreciated by those of ordinary skill in the art, numerous other means are contemplated for adjustably mounting the rotary tendon slicer 28 adjacent the cone line 16 in a manner that allows the slicer 28 to be tilted and its orientation fixed, and such contemplated means can be substituted for the means described above without departing from the present invention.

Referring to FIGS. 2 and 5, the rear support wall 14 of the apparatus 10 is a longitudinally oriented wall positioned behind the cone line 16 in a parallel orientation therewith. The rear support wall 14 is rigidly mounted to a base (not shown) that is seated on a plant floor or other surface. The support wall 14 is firmly supported by the base and is thereby secured against movement that could otherwise result from external forces acting on the support wall 14 or attached components.

An elongated rear stabilizing rail 70 (see FIG. 5) is rigidly mounted to the rear support wall 14 by a pair of brackets 72 and 74 (see FIG. 2) in a longitudinally-extending orientation directly behind the cones 18 of the cone line 16. The rail 70 preferably extends from a location upstream of the wishbone blade 26 to a position downstream of the rotary tendon slicer 28. The rail 70 preferably has a rearwardly-angled upstream end 76 (see FIG. 3), but this is not critical. The rail 70 is provided for limiting the rearward movement of poultry carcasses on the cone line 16 that is caused by external forces acting on the carcasses, as will be described in greater detail below.

In addition to providing a mounting platform for the rear stabilizing rail 70, the rear support wall 14 provides the cutting area of the apparatus (i.e. the area behind the wishbone blade 26 and the rotary tendon slicer 28) with a rear enclosure for protecting workers from the moving parts and sharp surfaces of the apparatus 10. The rear support wall 14 also provides a barrier to poultry matter that may be thrown from carcasses during cutting by the rotary tendon slicer 28 (as described below). It is contemplated that the rear support wall 14 can be omitted and that the rear stabilizing rail 70 can be mounted to the support frame 22 or to an additional support frame erected in the same general location as the rear support wall 14.

As described above, the cone line 16 is a generally conventional cone line of the type found in many poultry processing facilities, except that the cones 18 of the cone line 16 preferably include certain features that facilitate complementary interaction with other components of the apparatus 10. Referring to FIG. 10, a first such feature is a narrow, vertically-elongated slot 80, hereafter referred to as the "backbone slot 80," formed in the top and side walls of each cone 18. The backbone slot 80 is preferably about ⅜ inch wide and about 9/16 inch deep and extends along the entire height of each cone 18. When the cone 18 is operatively mounted on the cone line 16, the horizontal walls that define the backbone slot 80 are directed rearwardly, away from the cutting station 12 and are oriented in a perpendicular relationship with the downstream path of travel of the cone 18.

The backbone slot 80 is provided for receiving and retaining the backbone of a poultry carcass when the carcass is mounted on a cone 18 (i.e. with the cone 18 extending upwardly, into the cavity of the carcass in a conventional manner). With the backbone of a poultry carcass retained thusly, the carcass is effectively secured against rotational movement relative to the cone 18 that might otherwise result from external forces acting on the carcass. Specifically, the carcass is secured in a forward-facing orientation with the chest of the carcass directed toward the cutting station 12 of the apparatus as the carcass is conveyed thereby (as described below). It is contemplated that the backbone slot 80 can be omitted or that alternative means for securing the orientations of poultry carcasses on the cones 18 can be implemented without departing from the present invention.

Referring to FIG. 11, a second feature of the cones 18 that is provided for facilitating complementary interaction with other components of the apparatus 10 is a horizontally-oriented notch 82, hereafter referred to as the "blade notch 82," that is formed in the sidewall of each cone 18 adjacent the cone's top. The blade notch 82 is located diametrically opposite the backbone slot 80 about the circumference of the cone 18 and is directed forward, toward the cutting station 12 when the cone 18 is operatively mounted on the cone line 16. The operative position of the blade notch 82 allows the angled, circular blade 54 of the rotary tendon slicer 28 to extend into the notch 82 without striking the surface of the cone 18 as the cone 18 is conveyed past the slicer 28 (as described below). It is contemplated that the shape of the notch 82 can be varied or that the notch 82 can be omitted and the position of the blade 54 varied without departing from the present invention.

During typical operation of the apparatus 10, as depicted in FIGS. 13-18, poultry carcasses 100 are mounted on the cones 18 with the vertebrae of the carcasses inserted into the backbone slots 80 of the cones 18 (in the manner described above) and are conveyed in the downstream direction by the cone line 16. The heads and legs of the poultry carcasses 100 are preferably removed prior to the carcasses being passed through the apparatus 10, and the wishbones 102 of the carcasses 100 are exposed and face forward.

As a poultry carcass 100 is conveyed downstream through the apparatus 10, it first passes under the upstream end 35 of the mounting rail 24 and is engaged by the depressor bar 34. The depressor bar 34 creates a generally downwardly directed force on the top of the carcass 100 as the carcass is conveyed beneath the depressor bar 34, and particularly on the top of the wishbone 102. The downward force on the top of the wishbone 102 causes the wishbone to act like a lever, with the tenders 104 and 106 of the carcass 100 acting as a fulcrum, thereby urging the lower end of the wishbone 102 to move forward, away from the tenders 104 and 106 of the carcass. Of course, the lower end of the wishbone 100 is still connected to the adjacent anatomical structures of the carcass 100 by tissue and tendon and its movement is therefore restricted.

The poultry carcass 100 is conveyed further downstream into engagement with the cutting blade 36 of the wishbone knife 26, with the piercing tip 50 of the cutting blade 36 piercing through the carcass 100 at a point laterally intermediate the wishbone 102 and the tenders 104 and 106. If it is found that the cutting blade 36 is piercing poultry carcasses 100 at a location other than intermediate the wishbones 102 and tenders 104 and 106 of carcasses 100, the position of the wishbone knife 26 can be adjusted in the manner described above.

As the poultry carcass 100 continues downstream along the wishbone knife 26 the descending, sharpened, upstream edge 48 of the cutting blade 36 severs the carcass 100 from the point of entry of the piercing tip 50 downwardly and outwardly, along the curved contour of the blade 36. Specifically, the upstream edge 48 of the blade 36 severs the tissue and tendon that connect the lower portion of the wishbone 102 to the adjacent anatomical structures of the carcass 100 while the wishbone 102 itself rides on top of the outer surface of the cutting blade 36, as best shown in FIG. 16. As this cut is being made by the cutting blade 36, the rear stabilizing rail 70 prevents the poultry carcass 100 from being displaced rearwardly by the cutting blade 36 beyond a forward edge of the stabilizing rail 70, thereby keeping the carcass 100 in firm engagement with the blade 36.

As the carcass 100 is conveyed along the downstream portion of the sharpened upstream edge 48 of the cutting blade 36, the sharpened edge 48 descends below the wishbone's lowermost point of attachment to the adjacent anatomical structures and completely severs the lower portion of the wishbone 102 from the carcass 100. The top ends of the wishbone 102 are left connected to the carcass 100, with the top edge 52 of the cutting blade 36 passing below their points of attachment to the carcass 100. The cutting blade 36 preferably does not engage or damage the tenders 104 and 106 of the carcass 100.

The poultry carcass 100 continues downstream and is brought into engagement with the separating fin 38 of the wishbone knife 26, with the upstream end of the top edge 53 (not within view) of the separating fin 38 extending into a crotch between the top ends of the wishbone 102 and the top ends of the tenders 104 and 106. As the carcass 100 moves further downstream, the upwardly curving top edge 53 of the separating fin 38 lifts and rotates the wishbone 102 upwardly, about its upper points of attachment to the adjacent anatomical structures, to a substantially vertical orientation on the rear side of the separating fin 38, as best shown in FIG. 16. The wishbone 102 is thereby mechanically separated from the tenders 104 and 106 of the carcass 100 while remaining attached to the carcass 100 because even after the blade 36 severs the wishbone from the soft tissue, the bias due to the wishbone's connection to the skeleton holds it in place against the tissue.

Figure 17:
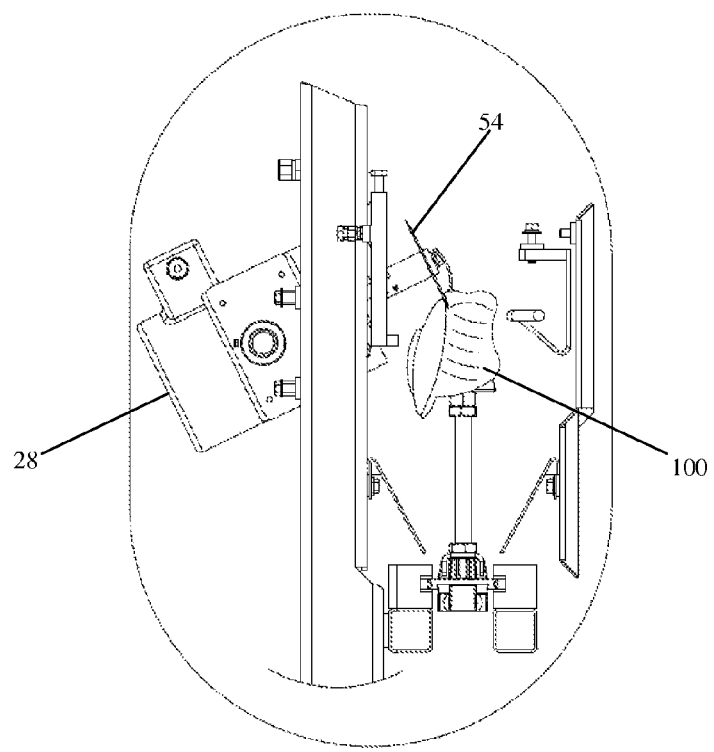
FIGS. 17 and 18 are a series of views illustrating the tops of the tenders of a poultry carcass being severed from the carcass by the preferred embodiment of the present invention shown in FIG. 1
Figure 18:
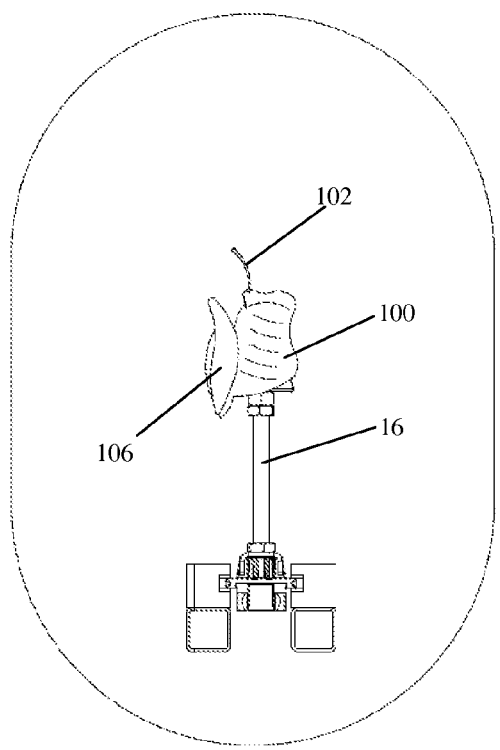

With the wishbone 100 retained in a vertical orientation by the spreading fin 38 and the tenders 104 and 106 thereby exposed, the poultry carcass 100 is conveyed further downstream into engagement with the rotating circular blade 54 of the rotary tendon slicer 28. Referring to FIGS. 17 and 18, the circular blade 54 passes beneath the raised wishbone and severs the tendons that attach the tops of the tenders 104 and 106 (tender 104 is not within view) to the adjacent anatomical structures of the carcass 100. In doing so, the angled, circular blade 54 extends through the tendons, into the blade notch 82 of the passing cone 18 (not within view), thereby completely severing the tendons without striking the cone 18. If it is found that the circular blade 54 is cutting areas of poultry carcasses 100 other than the tendons that connect the tops of the tenders 104 and 106 to the adjacent anatomical structures, the position of the rotary tendon slicer 28 can be adjusted in the manner described above.

After the tendons have been severed, the top ends of the tenders 104 and 106 are freed from the carcass 100, as best shown in FIG. 18. Finally, after the carcass 100 has been conveyed downstream beyond the components of the apparatus 10, the tenders 104 and 106 can be manually stripped from the carcass 100 with relatively little effort. Alternatively, it is contemplated that the tenders 104 and 106 can be automatically stripped from the carcass 100.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for preparing a poultry carcass for removal of tenders therefrom, wherein the carcass is conveyed along a product path in a downstream direction by a cone line, the apparatus comprising:
   a. at least one support frame;
   b. a cutting blade mounted to said at least one support frame having a piercing tip and a sharp edge that are configured to pierce and sever connective tissue that connects a lower portion of a wishbone to the carcass as the carcass is conveyed downstream along the cutting blade;
   c. a separating fin positioned downstream of the piercing tip of the cutting blade for engaging the wishbone and forcing the wishbone away from the tenders as the carcass is conveyed downstream; and
   d. a tendon slicer mounted to said at least one support frame and positioned downstream from the cutting blade for cutting connective tissue that connects the tenders to the carcass as the carcass is conveyed downstream.

2. The apparatus in accordance with claim 1, wherein the cutting blade is adjustably mounted to said at least one support frame.

3. The apparatus in accordance with claim 1, wherein the sharp edge of the cutting blade extends downstream and downwardly from the piercing tip.

4. The apparatus in accordance with claim 1, wherein the tendon slicer comprises a rotatably driven, circular blade.

5. The apparatus in accordance with claim 1, wherein the separating fin extends downstream and upwardly and from a top edge of the cutting blade.

6. The apparatus in accordance with claim 1, wherein the separating fin is adjustably mounted to said at least one support frame.

7. The apparatus in accordance with claim 1, wherein the tendon slicer is adjustably mounted to said at least one support frame.

8. The apparatus in accordance with claim 1, further comprising an elongated depressor bar mounted to said at least one support frame and configured to apply a downward force on the carcass as it is conveyed downstream below the depressor bar.

9. The apparatus in accordance with claim 1, further comprising a rear wall located opposite said at least one support frame and having an elongated rear stabilizing rail mounted thereto, the rear stabilizing rail being configured to restrain rearward movement of the carcass as the carcass is conveyed downstream.

10. The apparatus in accordance with claim 1, further comprising an elongated rear stabilizing rail mounted to said at least one mounting frame, the rear stabilizing rail being configured to restrain rearward movement of the carcass as it is conveyed downstream.

11. A method for preparing a poultry carcass for removal of tenders therefrom, the method comprising:
   a. conveying the carcass into engagement with a fixed cutting blade that severs connective tissue that connects a lower portion of a wishbone to the carcass;
   b. conveying the carcass into engagement with a separating fin that engages the wishbone and forces the wishbone upwardly, away from the tenders of the carcass; and
   c. conveying the carcass into engagement with a tendon slicer that severs connective tissue that connects the tenders to the carcass.

12. The method in accordance with claim 11, further comprising conveying the carcass into engagement with an elongated depressor bar that applies a downward force on the carcass.

13. The method in accordance with claim 11, further comprising restraining horizontal and vertical movement of the carcass.

* * * * *